US011153791B2

(12) United States Patent
Hsieh

(10) Patent No.: US 11,153,791 B2
(45) Date of Patent: Oct. 19, 2021

(54) FULL AND DELTA CONFIGURATION IN A CENTRAL UNIT-DISTRIBUTED UNIT ARCHITECTURE

(71) Applicant: Google LLC, Mountain View, CA (US)

(72) Inventor: Ching-Jung Hsieh, Taipei (TW)

(73) Assignee: Google LLC, Mountain View, CA (US)

( * ) Notice: Subject to any disclaimer, the term of this patent is extended or adjusted under 35 U.S.C. 154(b) by 49 days.

(21) Appl. No.: 16/272,742

(22) Filed: Feb. 11, 2019

(65) Prior Publication Data
US 2019/0253937 A1 Aug. 15, 2019

Related U.S. Application Data

(60) Provisional application No. 62/630,780, filed on Feb. 14, 2018.

(51) Int. Cl.
*H04W 36/00* (2009.01)
*H04W 76/15* (2018.01)
(Continued)

(52) U.S. Cl.
CPC ... *H04W 36/0033* (2013.01); *H04W 36/0061* (2013.01); *H04W 76/15* (2018.02);
(Continued)

(58) Field of Classification Search
None
See application file for complete search history.

(56) References Cited

U.S. PATENT DOCUMENTS

2012/0287902 A1\* 11/2012 Bufe ............... H04L 69/18
370/331
2018/0359800 A1\* 12/2018 Wu ............... H04J 11/0076
(Continued)

FOREIGN PATENT DOCUMENTS

CN 106162730 11/2016
CN 106162730 A \* 11/2016
(Continued)

OTHER PUBLICATIONS

"International Search Report and Written Opinion", PCT Application No. PCT/US2019/017113, dated May 21, 2019, 13 pages.
(Continued)

*Primary Examiner* — Ajit Patel
*Assistant Examiner* — Pamit Kaur
(74) *Attorney, Agent, or Firm* — Colby Nipper PLLC

(57) ABSTRACT

This document describes methods, devices, systems, and means for determining configurations for the exchange of configuration information during network role transitions, such as a secondary node change or a handover. A secondary base station (123) node includes a central unit (CU) (410) and one or more distributed units (DU) (420). The secondary base station node is configured to receive an addition request message including configuration information and, based on the received configuration information, determine, at the CU (410) of the secondary base station (123), whether to apply a full configuration or a delta configuration. The CU (410) generates secondary cell group information, based on cell group configuration information received from the one or more DUs (420), and send an addition response message, including the generated secondary cell group information, to a master base station (122).

26 Claims, 6 Drawing Sheets

(51) Int. Cl.
*H04W 88/18* (2009.01)
*H04W 88/10* (2009.01)
*H04W 76/27* (2018.01)
*H04W 92/12* (2009.01)

(52) U.S. Cl.
CPC ........... *H04W 76/27* (2018.02); *H04W 88/10* (2013.01); *H04W 88/184* (2013.01); *H04W 92/12* (2013.01)

(56) References Cited

U.S. PATENT DOCUMENTS

| | | |
|---|---|---|
| 2019/0281518 A1 | 9/2019 | Wu |
| 2019/0281650 A1 | 9/2019 | Wu |
| 2019/0380067 A1* | 12/2019 | Rosa .................. H04W 36/0072 |
| 2020/0120559 A1* | 4/2020 | Centonza .......... H04W 36/0072 |
| 2020/0329408 A1* | 10/2020 | Selvaganapathy .... H04W 36/00 |

FOREIGN PATENT DOCUMENTS

| | | | |
|---|---|---|---|
| JP | 6123009 | 4/2017 | |
| WO | WO-2019097470 A1 * | 5/2019 | ........ H04W 36/0069 |
| WO | 20190160743 | 8/2019 | |
| WO | 2019244974 | 12/2019 | |

OTHER PUBLICATIONS

"Technical Specification Group Radio Access Network", 3GPP TS 38.401 V15.0.0, dated Dec. 2017, 23 pages.

"5G; Study on New Radio (NR) access technology", ETSI TR 138 912 V14.0.0 (May 2017), (3GPP TR 38.912 version 14.0.0 Release 14), May 5, 2017, 77 pages.

"Introduction of Stage 2 Text for Data forwarding", 3GPP TSG-RAN WG3#NTR Adhoc 1801 R3-180585, Sophia Antipolis, France, Jan. 22-26, 2018, Jan. 22, 2018-Jan. 26, 2018, 4 pages.

"5G NG-RAN Overall Procedures—Multi-Connectivity Operation", Accessed from: https://itectec.com/spec/5g-ng-ran-overall-procedures-multi-connectivity-operation/ on May 20, 2020, May 20, 2020, 3 pages.

"5G; NG-RAN; Architecture description", ETSI TS 138 401 V15.2.0 (Jul. 2018), Jul. 2018, 40 pages.

"International Preliminary Report on Patentability", Application No. PCT/US2019/017113, dated Aug. 18, 2020, 7 pages.

"Foreign Office Action", EP Application No. 19708701.8, dated Jul. 8, 2021, 4 pages.

"Foreign Office Action", IN Application No. 202047034838, dated Aug. 27, 2021, 6 pages.

* cited by examiner

FULL AND DELTA CONFIGURATION IN A CENTRAL UNIT-DISTRIBUTED UNIT ARCHITECTURE

RELATED APPLICATION

This application claims priority under 35 U.S.C. § 119(e) to U.S. Provisional Patent Application 62/630,780, filed on Feb. 14, 2018, which is incorporated herein by reference in its entirety.

BACKGROUND

The evolution of wireless communication to fifth generation (5G) standards and technologies provides higher data rates and greater capacity, with improved reliability and lower latency that enhances mobile broadband services. 5G technologies also provide new classes of services for vehicular networking, fixed wireless broadband, and the Internet of Things (IoT).

A unified air interface, which utilizes licensed, unlicensed, and shared license radio spectrum in multiple frequency bands is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband. Another aspect of enabling the capabilities of 5G systems is the use of Multiple Input Multiple Output (MIMO) antenna systems to beamform signals transmitted between base stations and user equipment to increase the capacity of 5G radio networks.

To support the transition to 5G networks, multiple radio access technology connectivity enables a user equipment (UE) to simultaneously connect to Evolved Universal Terrestrial Radio Access (E-UTRA) and 5G base stations. In Multi-Radio-Access-Technology (MRAT) Dual Connectivity (DC), there are interfaces between network nodes (E-UTRA and/or 5G base stations) for exchanging information, such as cell-group configurations. Upon a network role transition, such as secondary node change or handover, there is a need to exchange configurations or signaling from the source node to target node to help the target node prepare follow-up configurations. Depending on the received configuration versions or implementation concerns, the target node decides whether to perform delta configuration based on the current configuration from the source node or to perform full configuration.

Additionally, the architecture of the 5G Radio Access Network (RAN) provides flexibility in the deployment of components of base stations. A 5G base station may be a monolithic unit that supports all the network layer entities of the RAN, or the base station may be distributed with a central unit (CU) that implements upper-layer network entities and is interfaced to multiple distributed units (DU) that support lower-layer network entities. The exchange and signaling of configurations between the CU and the DUs in a base station are undefined.

By way of background, related interactions between the E-UTRA base stations and 5G base stations are specified in 3GPP TS 38.331 v15.0.1, 3GPP TS 37.340 v15.0.0, 3GPP TS 38.300 v15.0.0, and 3GPP TS 36.423 v15.0.0. The F1 interface between the CU and the DU are introduced in 3GPP TS 38.401 v15.0.0 and 3GPP TS 38.473 v15.0.0.

SUMMARY

This summary is provided to introduce simplified concepts of central unit-distributed unit architecture. The simplified concepts are further described below in the Detailed Description. This summary is not intended to identify essential features of the claimed subject matter, nor is it intended for use in determining the scope of the claimed subject matter.

In some aspects, a method for determining a user equipment (UE) context by a central unit (CU) of a base station engaged as a secondary base station in dual-connectivity communication with a UE is described in which the CU receives a configuration message including configuration information from a master node of the dual-connectivity communication. Based on the received configuration message, the CU determines a configuration type, generates a UE Context Setup Request message based on the determined configuration type, and sends the generated UE Context Setup Request message to a Distributed Unit (DU) of the base station, the generated UE Context Setup Request effective to direct the DU to generate a cell-group configuration. The CU receives the generated cell-group configuration, generates a secondary-cell-group configuration using the received cell-group configuration, and sends the secondary-cell-group configuration in a configuration response message to the master node to configure the context for the UE.

In another aspect, a method for determining a user equipment (UE) context for a handover by a central unit (CU) of a target base station for dual-connectivity communication with a UE is described in which the CU receives a Handover Request configuration message including configuration information from a source base station. Based on the received configuration message, the CU determines a configuration type, generates a UE Context Setup Request message based on the determined configuration type, and sends the generated UE Context Setup Request message to a Distributed Unit (DU) of the base station, the generated UE Context Setup Request effective to direct the DU to generate a cell-group configuration. The CU receives the generated cell-group configuration, generates a Handover Command using the received cell-group configuration, and sends the Handover Command to the source base station.

In a further aspect, a base station including a central unit (CU) and one or more distributed units (DU), with each DU being connected to the CU via an F1 interface, is described. The CU is configured to: receive a configuration message including configuration information from a master node; based on the received configuration message, determine a configuration type; based on the determined configuration type, generate a User Equipment (UE) Context Setup Request message; and send the generated UE Context Setup Request message to at least one of the one or more DUs using the F1 interface. The at least one DU is configured to: receive the UE Context Setup Request message using the F1 interface, generate a cell-group configuration, and send the generated cell-group configuration to the CU using the F1 interface. The CU is configured to: receive the generated cell-group configuration using the F1 interface, generate a secondary-cell-group configuration using the received cell-group configuration, and send the secondary-cell-group configuration in a response message to the configuration message to the master node.

BRIEF DESCRIPTION OF THE DRAWINGS

The details of one or more aspects of full and delta configuration in a central unit-distributed unit architecture is described below. The use of the same reference numbers in different instances in the description and the figures may indicate like elements.

DETAILED DESCRIPTION

This document describes methods, devices, systems, and means for determining configurations for the exchange of configuration information during network role transitions, such as a secondary node change or a handover. A secondary base station node includes a central unit (CU) and one or more distributed units (DU) that are connected to the CU via an F1 interface. The secondary base station node receives an addition request message including configuration information for its configuration and, based on the received configuration information, determines, at the CU of the secondary base station, whether to apply a full configuration or a delta configuration. The CU generates secondary cell group information, based on cell group configuration information received from the one or more DUs, and sends an addition response message, including the generated secondary cell group information, to a master base station.

Upon a network role transition (e.g., handover), there is a need to exchange configurations and/or signaling from a source node (base station) to a target node to assist the target node to prepare for follow-up configurations. Depending on the received configuration versions or implementation concerns, the target node decides whether to perform delta configuration change based on the current configuration from the source node or, alternatively, to perform a full configuration. However, a process for these role transition configurations is not defined for 5G NR base stations with a central unit-distributed unit architecture in which the central unit and the distributed unit(s) host different network layer entities. In this central unit-distributed unit architecture, no defined process and protocols exist for the determination of configuration information by the control unit and the distributed units.

Example Environment

Figure 1:
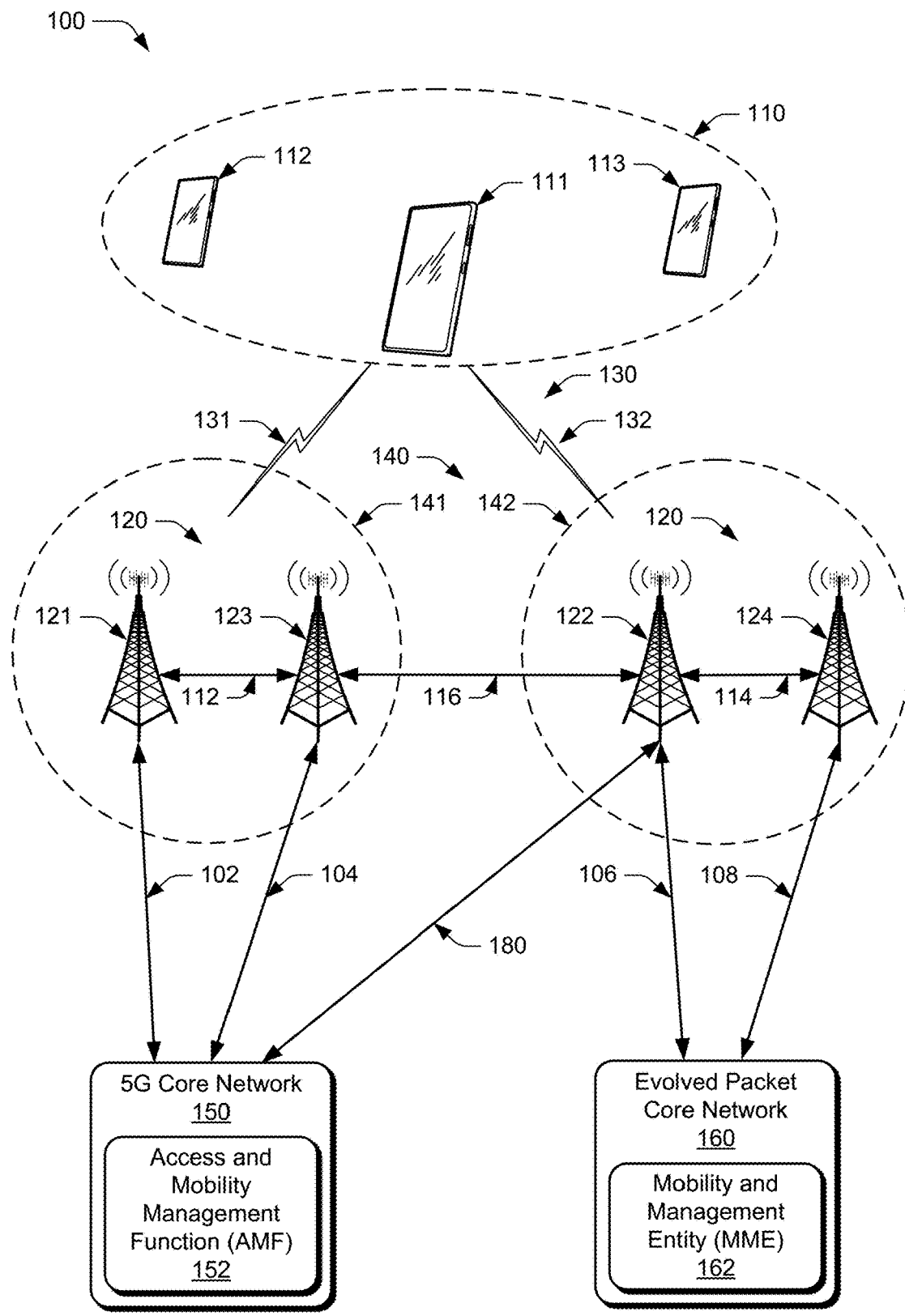
FIG. 1 illustrates an example wireless network system in which various aspects of central unit-distributed unit architecture can be implemented.

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 through the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110, as well as dual connectivity, such as single-RAT LTE-LTE or NR-NR dual connectivity or Multi-Radio Access Technology (Multi-RAT) Dual Connectivity (MR-DC). MR-DC includes E-UTRA-NR Dual Connectivity (EN-DC), NG-RAN E-UTRA-NR Dual Connectivity (NGEN-DC), and NR-E-UTRA Dual Connectivity (NE-DC).

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 112 and the base stations 122 and 124 communicate through an X2 interface at 114.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Example Devices

Figure 2:
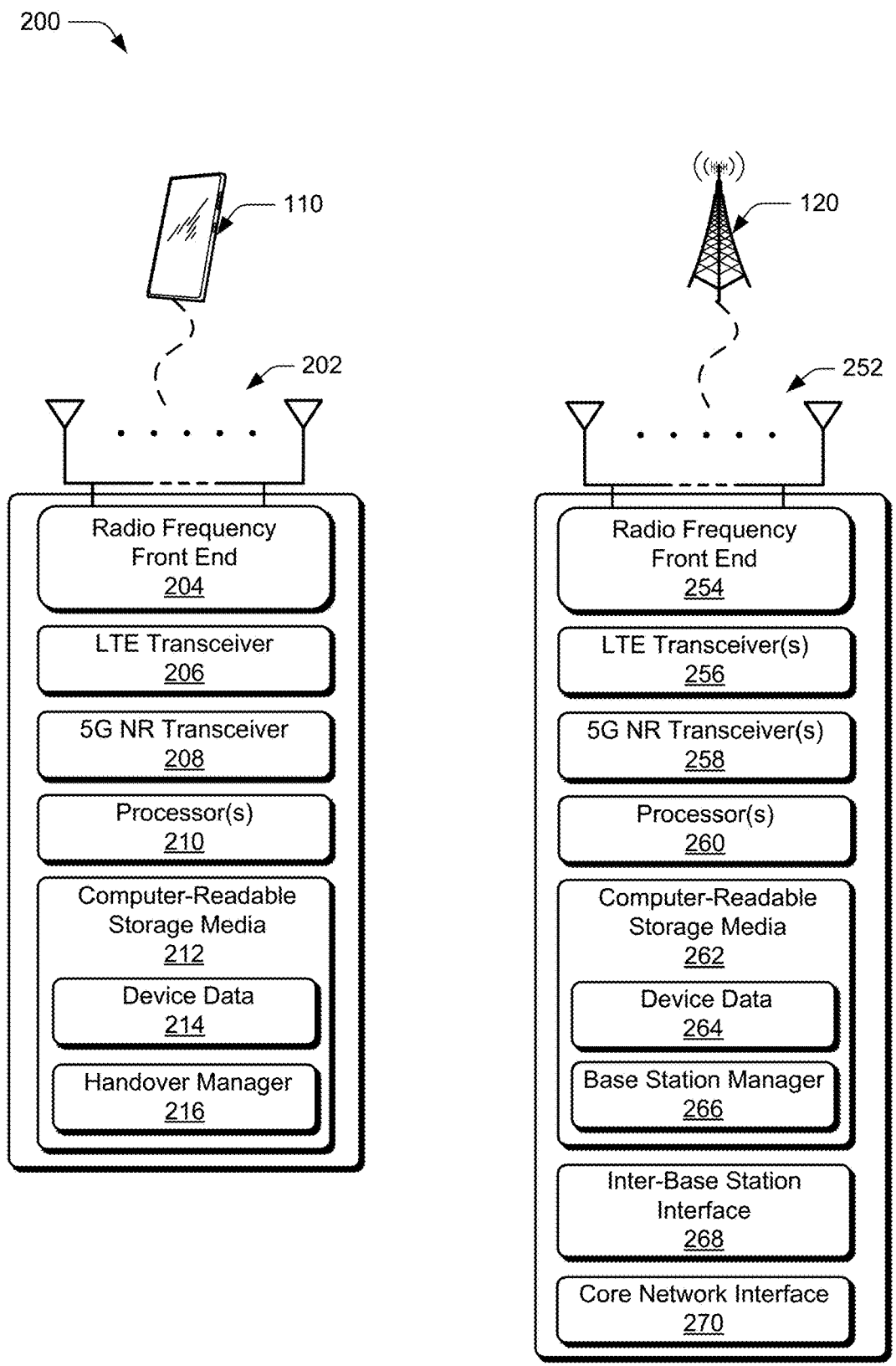
FIG. 2 illustrates an example device diagram that can implement various aspects of central unit-distributed unit architecture.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, and a 5G NR transceiver 208 for communicating with base stations 120 in the RAN 140. The RF front end 204 of the user equipment 110 can couple or connect the LTE transceiver 206 and the 5G NR transceiver 208 to the antennas 202 to facilitate various types of wireless communication. The antennas 202 of the user equipment 110 may include an array of multiple antennas that are configured similarly to or differently from each other. The antennas 202 and the RF front end 204 can be tuned to, and/or be tunable to, one or more frequency bands defined by the 3GPP LTE and 5G NR communication standards and implemented by the LTE transceiver 206 and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

In some implementations, the CRM 212 may also include a handover manager 216. The handover manager 216 can communicate with the antennas 202, the RF front end 204, the LTE transceiver 206, and/or the 5G NR transceiver 208 to monitor the quality of the wireless communication links 130. Based on this monitoring, the handover manager 216 can determine to trigger a handover.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and/or the 5G NR transceivers 258 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency band defined by the 3GPP LTE and 5G NR communication standards, and implemented by the LTE transceivers 256 and one or more 5G NR transceivers 258. Additionally, the antennas 252, the RF front end 254, the LTE transceivers 256, and/or one or more 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the user equipment 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the user equipment 110, as well as communication with a core network, such as the core network 150, and routing user-plane and control-plane data for joint communication. Additionally, the base station manager 266 may allocate air interface resources and schedule communications for the UE 110 and base stations 120 when the base station 120 is acting as a master base station for the base stations 120.

The base stations 120 include an inter-base station interface 268, such as an Xn and/or X2 interface, which the base station manager 266 configures to exchange user-plane and control-plane data between other base stations 120, to manage the communication of the base stations 120 with the user equipment 110. The base stations 120 include a core network interface 270 that the base station manager 266 configures to exchange user-plane and control-plane data with core network functions and/or entities.

Figure 3:
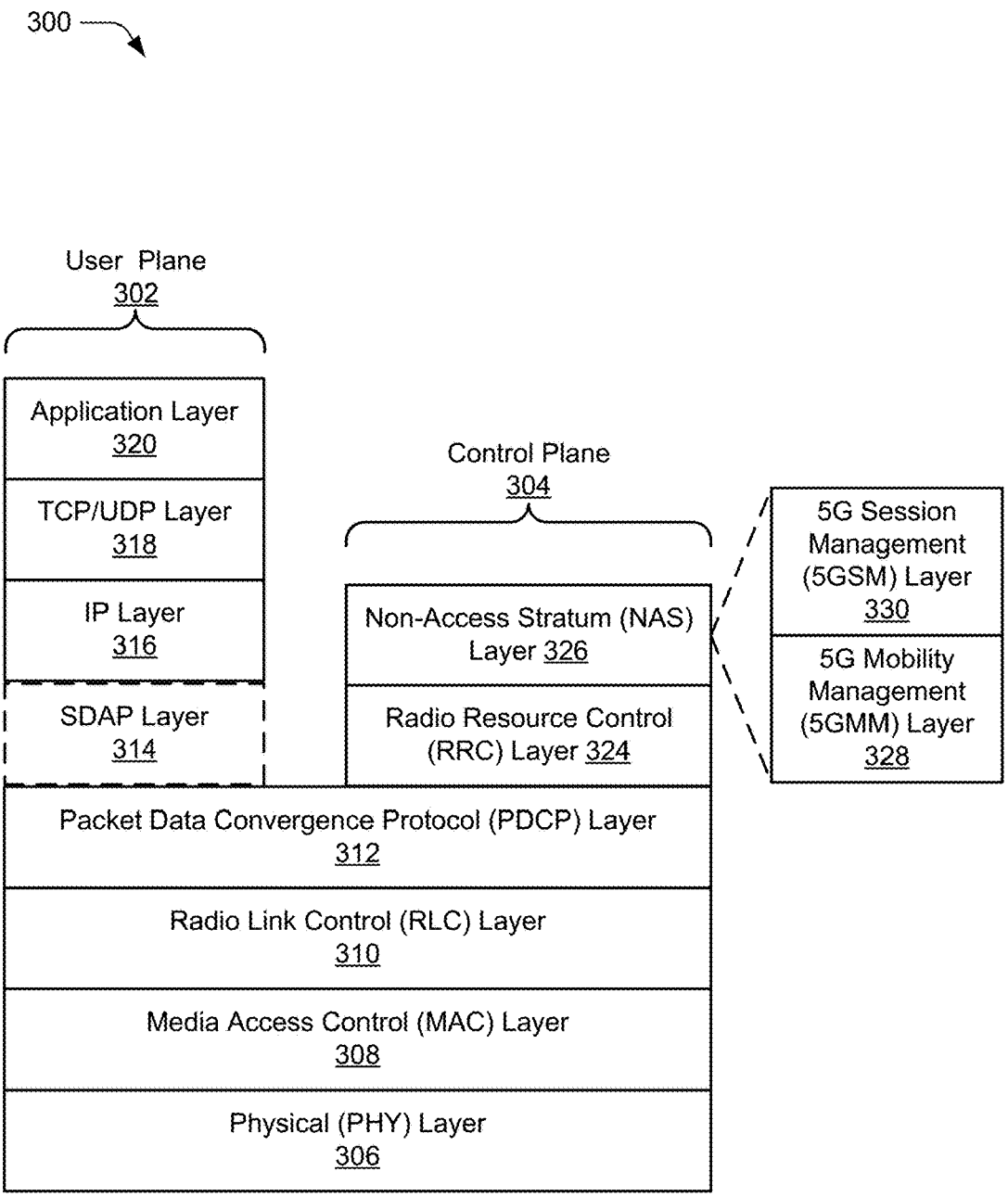
FIG. 3 illustrates an additional example network environment in accordance with one or more aspects of central unit-distributed unit architecture.

FIG. 3 illustrates an example block diagram 300 of a wireless network stack model 300 (stack 300). The stack 300 characterizes a communication system for the example environment 100, in which various aspects of central unit-distributed unit architecture can be implemented. The stack 300 includes a user plane 302 and a control plane 304. Upper layers of the user plane 302 and the control plane 304 share common lower layers in the stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Media Access Control (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 130. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., Wireless Local Area Network (WLAN) communications).

The NAS layer 326 provides support for mobility management (e.g., using a Fifth-Generation Mobility Management (5GMM) layer 328) and packet data bearer contexts (e.g., using a Fifth-Generation Session Management (5GSM) layer 330) between the UE 110 and entities or functions in the core network, such as the Access and Mobility Management Function 152 (AMF 152) of the 5GC 150 or the like. The NAS layer 326 supports both 3GPP access and non-3GPP access.

In the UE 110, each layer in both the user plane 302 and the control plane 304 of the stack 300 interacts with a corresponding peer layer or entity in the base station 120, a core network entity or function, and/or a remote service, to support user applications and control operation of the UE 110 in the RAN 140.

gNB Central-Distributed Node Architecture

Figure 4:
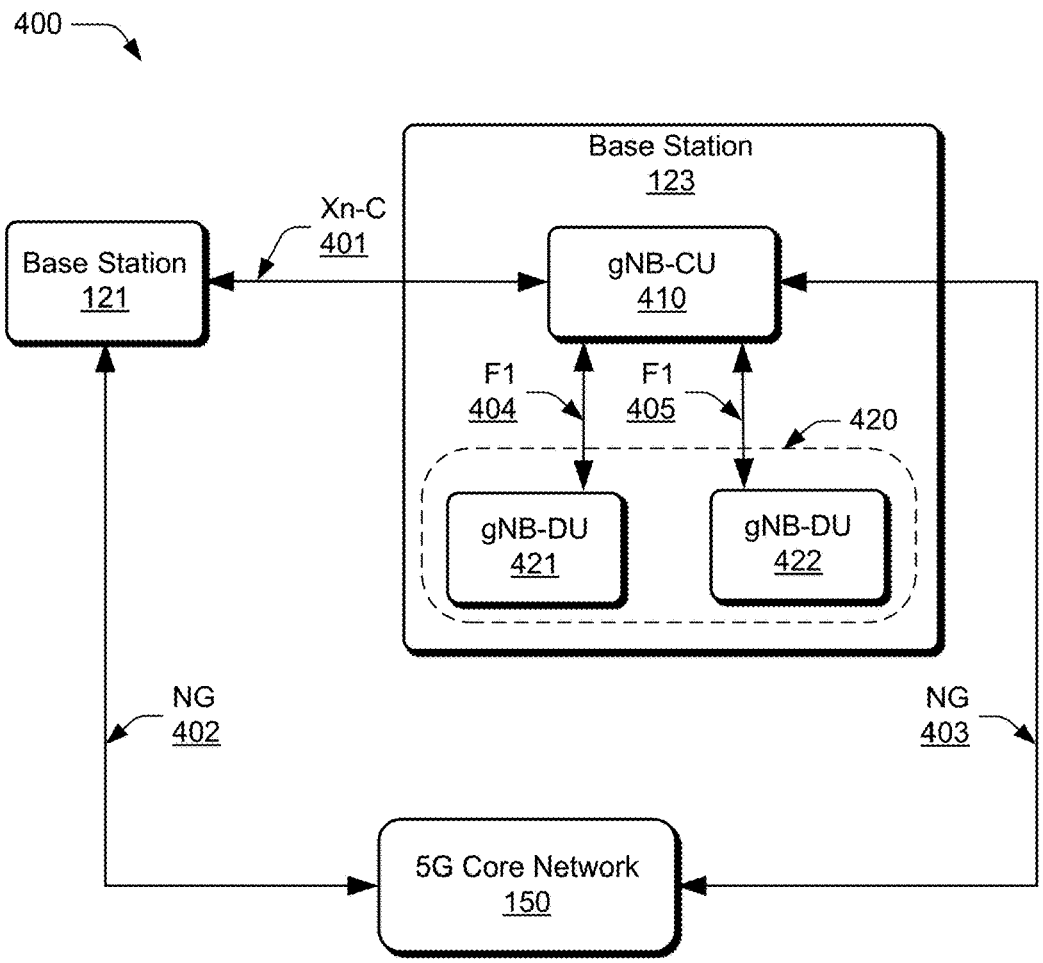
FIG. 4 illustrates an example wireless network system in which various aspects of central unit-distributed unit architecture can be implemented.

FIG. 4 illustrates an example system 400 generally related to a system including a distributed base station implemented using a central node-distributed node architecture in accordance with one or more aspects of central unit-distributed unit architecture. In the system 400, the base station 121 is illustrated as a non-distributed base station and the base station 123 is illustrated as a distributed base station implemented using a central node-distributed node architecture. The base station 123 includes a gNB-Central Unit (gNB-CU) 410 and multiple gNB Distributed-Units (gNB-DU) 420, illustrated as gNB-DU 421 and 422. Although two gNB-DUs 420 are illustrated for the sake of clarity in FIG. 4, any suitable number of gNB-DUs can be interfaces to the gNB-CU 410.

The base stations 121 and 123 communicate through an Xn-C interface 401 for control-plane communications. In the base station 123, implemented using the central node-distributed node architecture, the Xn-C interface 401 is terminated by the gNB-CU 410. The base stations 121 and 123 connect, at 402 and 403 respectively, to the 5GC 150 through an NG interface for control-plane signaling.

In the central node-distributed node architecture, the gNB-CU 410 is a logical node hosting the RRC layer 324, the SDAP layer 314, and the PDCP layer 312 entities of the gNB or the RRC layer 324 and the PDCP layer 312 entities of an en-gNB (e.g., a gNB connected to an evolved packet core) that controls the operation of one or more gNB-DUs 420. The gNB-CU 410 includes an F1 interface to communicate with the gNB-DUs 420, shown at 404 and 405. Although described as logical nodes, the gNB-CU 410 and/or the gNB-DUs 420 devices may include any suitable components described with respect to the base station 120 in FIG. 2.

The gNB-DUs 420 are logical nodes hosting the RLC layer 310, MAC layer 308, and PHY layer 306 protocols of the gNB or en-gNB. The operation of the gNB-DUs 420 is partly controlled by gNB-CU 410. One gNB-CU 410 supports one or multiple cells in the RAN 140, but a single cell is only supported by a single gNB-DU 420. Each gNB-DU 420 terminates the F1 interface with the gNB-CU 410 that serves as the central unit for that gNB-DU 420. Each gNB-DU 420 connects operationally to only one gNB-CU 410. Alternatively or optionally, for resiliency in network operations, a gNB-DU 420 may be connected to multiple gNB-CUs 420 using any suitable implementation, for example, network interconnection hardware and/or software that provides failover for a gNB-DU 420 to backup gNB-CU 410 if a primary gNB-CU 410 fails or becomes unavailable to the gNB-DU 420.

In another example of the central node-distributed node architecture, for E-UTRA-NR dual connectivity (EN-DC), the gNB-CU 410 terminates the S1-U and X2-C interfaces for the base station 123 (e.g., an en-gNB). The gNB-CU 410 and connected gNB-DUs 420 are only visible to other base stations 120 and the 5GC 150 or EPC 160 as a gNB.

UE Context Management

Figure 5:
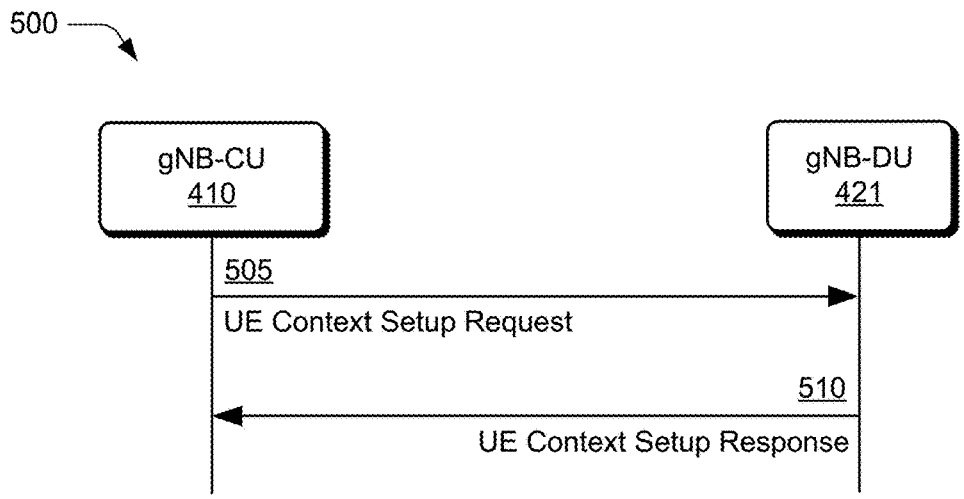
FIG. 5 illustrates an example of data and control transactions between devices in accordance with one or more aspects of central unit-distributed unit architecture.

FIG. 5 illustrates an example of user equipment (UE) context establishment in a base station 120, generally related to a UE Context Setup procedure in accordance with one or more aspects of central unit-distributed unit architecture. The purpose of the UE Context Setup procedure is to establish the UE Context including a signaling radio bearer (SRB), a data radio bearer (DRB), or the like for a UE 110 and uses UE-associated signaling.

The gNB-CU 410 initiates the UE Context Setup procedure by sending a UE Context Setup Request message 505 to the gNB-DU 421. If the gNB-DU 421 successfully establishes the UE context, the gNB-DU 421 replies to the gNB-CU 410 with UE Context Setup Response 510. If the gNB-DU 421 fails to successfully establish the UE context, such as failing to establish the DRB and/or the SRB, the gNB-DU 421 includes a cause value in the UE Context Setup Response 510 to enable the gNB-CU 410 to determine the reason for the failure to establish the UE context.

For example, CU to DU RRC Information and DU to CU RRC Information are used to exchange RRC information over the F1 interface during UE context management procedures. CU to DU RRC Information include the UE-CapabilityRAT-ContainerList IE and the CG-ConfigInfo IE. DU to CU RRC Information include the CellGroupConfig IE. In EN-DC, the gNB-CU receives the UE-CapabilityRAT-ContainerList IE and the CG-ConfigInfo IE from the master eNB (MeNB) and forwards those IEs to the gNB-DU as RRC containers, using the F1 interface. Also, in EN-DC, the gNB-DU generates the CellGroupConfig IE as defined in 3GPP TS 38.331 and sends it to the gNB-CU in the CU to DU RRC Information, using the F1 interface. The gNB-CU further generates the secondary cell group (SCG) radio configuration (e.g., CG-Config message) based on the received information from the gNB-DU. By way of reference, the UE-CapabilityRAT-ContainerList IE is defined in 3GPP TS 38.331 section 6.3.3, the CG-Config message (which is the renamed SCG-Config message) and CG-ConfigInfo message (which is the renamed SCG-ConfigInfo message) are defined in 3GPP TS 38.331 section 11.2.2, and the CellGroupConfig IE is defined in 3GPP TS 38.331 section 6.3.2.

Cell Group Configuration for Dual Connectivity

In E-UTRA-NR dual connectivity (EN-DC), a CellGroupConfig Information Element (IE) is used to configure a master cell group (MCG) and/or a secondary cell group (SCG) to the UE. For example, in EN-DC, the master cell group is E-UTRA and the secondary cell group is 5G NR. A cell group includes a MAC layer 308 entity, a set of logical channels with associated RLC layer 310 entities, a primary cell (SpCell), and one or more secondary cells (SCells).

A master base station 120 (MeNB) that is managing dual connectivity for the UE 110 can send a configuration message (e.g., a SCG-ConfigInfo message, a CG-ConfigInfo message, or a CellGroupConfigInfo message) to a secondary base station (SgNB) in the dual-connectivity communication with the UE 110 to perform actions such as establishing, modifying, or releasing an SCG. The message may include additional information, such as information to assist the SgNB to set a secondary cell group (SCG) configuration. In the central node-distributed node architecture, the gNB-CU 410 can send the message to a gNB-DU 420 to request the gNB-DU 420 to perform any of these actions (establish, modify, or release an SCG).

Handover Management

When EN-DC communication is established between the RAN 140 and the UE 110, a master base station for EN-DC (MeNB) is an E-UTRA base station, and a base station in the Secondary Cell Group (SCG) is a 5G NR base station (SgNB). In preparation for the handover of the UE 110 to a target MeNB with secondary node change, the source MeNB sends a Handover Preparation Information message (e.g., a Handover Request message including the HandoverPreparationInformation message) to the target MeNB that includes UE capability information and the target MeNB adds a target SgNB using an SgNB Addition Preparation procedure. In the central node-distributed node architecture, the target SgNB-CU 410 sends the Handover Preparation Information message (e.g., HandoverPreparationInformation message) to the target SgNB-DU 420.

In response to receiving the Handover Preparation Information message, the target MeNB generates an RRC Reconfiguration (e.g., RRCConnectionReconfiguration) message to perform the handover. The RRCConnectionReconfiguration message includes MCG and SCG configuration. The target MeNB sends the RRC Reconfiguration message to the source MeNB in a Handover Request Acknowledge message.

In one example, the target MeNB does not understand the MCG portion of the source RRC configuration but the target SgNB understands the SCG part of the source RRC configuration. In this example, the MeNB (master node, MN) decides to use full configuration and sets an LTEfullconfig flag in an LTE RRCConnectionReconfiguration message to release both the MCG and the SCG configuration. Additionally, the MeNB does not include a current dedicated SCG configuration (e.g., the sourceConfigSCG in an sgNB addition request). In other words, for the SgNB Addition Request to be sent to the SgNB, the target MeNB generates a configuration information (e.g., CG-ConfigInfo) which does not include the received current dedicated SCG configuration from the source MeNB.

In another example, the target MeNB understands the MCG part of the source RRC configuration but the target SgNB does not understand the SCG part of the RRC configuration. In this example, the SN indicates to the MN that it has applied full SCG configuration and indicates impacted bearers in a drb-toReleaseList. The MN sets an en-DC-release flag to TRUE in the LTE RRCConnectionReconfiguration message sent to the UE 110.

Configuration Management in a Central Node-Distributed Node Architecture

Upon network role transition there is a need to exchange configurations or signaling from the source node to target node to help the target node prepare follow-up configurations. There are two Multi-RAT Dual Connectivity operation-related aspects: Secondary Node Change (MN/SN initiated) and Inter-Master Node handover with or without a Secondary Node change.

Dual Connectivity with Secondary Node Change (MN/SN Initiated)

In the Secondary Node Change (MN or SN initiated) aspect, the Master node (eNB or gNB) sends a configuration message (e.g., an SgNB Addition Request) that includes configuration information (e.g., the SCG-ConfigInfo message, the CellGroupConfigInfo message, or the CG-Config-Info message) to the CU of the target secondary base station. The configuration information further contains a current dedicated SCG configuration (e.g., the sourceConfigSCG IE). The CU of target secondary base station decides whether to apply a full configuration or a delta configuration based on the configuration information received in the configuration message.

In one aspect, if the CU decides to perform the delta configuration, the CU sends a UE Context Setup Request message that includes a current dedicated SCG configuration (e.g., the sourceConfigSCG IE), included in the received configuration information, to the corresponding DU(s) using the F1 interface. After receiving the UE Context Setup Request message from the CU, each of the DU(s) generates the CellGroupConfig IE based on the received current dedicated SCG configuration (e.g., sourceConfigSCG IE), included in the received configuration information, and sends it in a UE Context Setup Response message to the CU using the F1 interface. The CU further generates the SCG radio configuration (e.g., CG-Config message) based on the received information from the DU(s). The CU of target Secondary node sends an SgNB Addition Request Acknowledge message that includes the configuration (e.g., CG-Config message) to the Master node.

In another example, if the CU decides to perform a full configuration, the CU does not include the current dedicated SCG configuration (e.g., the sourceConfigSCG IE) from the received configuration information to be included in the UE Context Setup Request message to the corresponding DU(s) using the F1 interface. This can be achieved by the CU generating a configuration information according to the received configuration information except the current dedicated SCG configuration, or that the CU takes the received configuration information but removes the current dedicated SCG configuration from it. After receiving the UE Context Setup Request message from the CU, each of the DU(s) generates the CellGroupConfig IE and sends it to the CU using the F1 interface.

The CU further generates the SCG radio configuration (e.g., CG-Config message) based on the received information from the DU(s). The CU of target Secondary node sends an SgNB Addition Request Acknowledge message that includes the configuration (e.g., CG-Config message) to the Master node. After receiving the message from CU of target Secondary node, the Master node sends an RRC message (e.g., an RRCReconfiguration message or an RRCConnectionReconfiguration message) to the UE 110 that includes the configuration information from target Secondary node.

Dual Connectivity Handover with Inter-Master Node Handover (with or Without a Secondary Node Change)

In another aspect, an inter-master node handover is configured with or without a secondary node change. For example, the source Master node sends a Handover Request message to the target Master node. The target Master node sends an SgNB Addition Request message that includes the configuration information (e.g., the SCG-ConfigInfo message, the CellGroupConfigInfo message, or the CG-Config-Info message) to the CU of target Secondary node. The CU of target Secondary node decides whether to apply the full configuration or the delta configuration based on the received configuration information.

For example, assuming that the CU determines to perform the delta configuration, the CU sends a UE Context Setup Request message that includes the current dedicated SCG configuration (e.g., the sourceConfigSCG IE) in the received configuration information to the corresponding DU(s) using the F1 interface.

After receiving the message from the CU, the DU(s) generates the CellGroupConfig IE based on the received current dedicated SCG configuration (e.g., sourceConfigSCG IE) in the received configuration information and sends it in the UE Context Setup Response message to the CU using the F1 interface. The CU further generates the SCG radio configuration (e.g., CG-Config message) based on the received information from the DU(s). The CU of target Secondary node sends an SgNB Addition Request Acknowledge message that includes the SCG radio configuration (e.g., CG-Config message) to the Master node.

In another example, the CU determines to perform the full configuration. The CU does not include the current dedicated SCG configuration (e.g., the sourceConfigSCG IE) from the received configuration information in the UE Context Setup Request message to the corresponding DU(s) using the F1 interface.

After receiving the message from the CU, the DU(s) generates the CellGroupConfig IE and sends it to the CU using the F1 interface. The CU further generates the SCG radio configuration (e.g., CG-Config message) based on the received information from the DU(s). The CU of target Secondary node sends an SgNB Addition Request Acknowledge message including the SCG radio configuration (e.g., CG-Config message) to the Master node. After receiving the message from the CU of target Secondary node, the Master node sends an RRC message (e.g., an RRCReconfiguration message or an RRCConnectionReconfiguration message), including the configuration information from target Secondary node, to the UE.

Handover Without Dual Connectivity (DC)

In a further aspect, the source node sends a Handover Request message that includes the HandoverPreparationInformation message to the CU of target node. The CU of the target node decides whether to apply a full configuration or a delta configuration based on the received configuration information used in the source node (e.g., the source Config IE).

For example, if the CU decides to perform the delta configuration, the CU sends a UE Context Setup Request message that includes a configuration information used in the source node (e.g., the sourceConfig IE) in the received HandoverPreparationInformation message to the corresponding DU(s) using the F1 interface. After receiving the message from the CU, the DU(s) generates a CellGroupConfig IE based on the received configuration information used in the source node (e.g., the sourceConfig IE) and sends it in the UE Context Setup Response to the CU using the F1 interface.

In another example, if the CU decides to perform a full configuration, the CU does not include the configuration information used in the source node (e.g., the sourceConfig IE) from the received HandoverPreparationInformation message in the UE Context Setup Request message to the corresponding DU(s) using the F1 interface. This can be achieved by the CU to generate a HandoverPreparationInformation message according to the received HandoverPreparationInformation message except the configuration information used in the source node, or that the CU takes the received HandoverPreparationInformation message but removes the configuration information used in the source node from it. After receiving the message from the CU, the DU(s) generates the CellGroupConfig IE and sends it to the CU using the F1 interface.

The CU of the target node further generates the HandoverCommand message that includes the received information from the DU(s) and sends a Handover Request Acknowledge message to the Master node. After receiving the HandoverCommand message from CU of the target node, the source node sends an RRC message (e.g., an RRCReconfiguration message or an RRCConnectionReconfiguration message), that includes the configuration information from target node, to the UE 110.

Example Methods

Example methods 600 and 700 are described with reference to FIGS. 6 and 7 in accordance with one or more aspects of central unit-distributed unit architecture. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
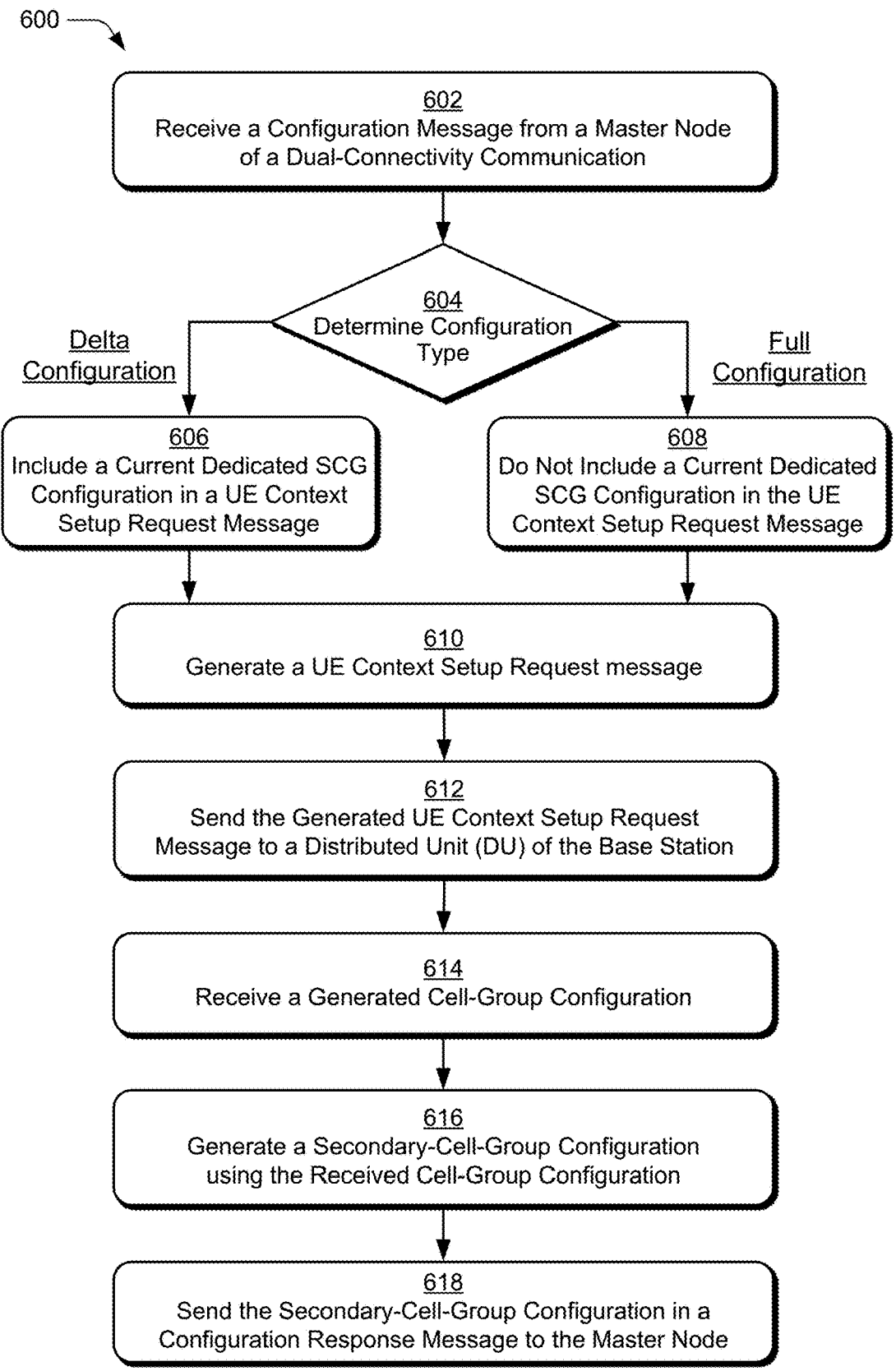
FIG. 6 illustrates an example method of delta and full configuration for secondary cell group configuration in accordance with one or more aspects of central unit-distributed unit architecture.

FIG. 6 illustrates example method(s) 600 of central unit-distributed unit architecture as generally related to delta and full configuration for secondary cell group configuration. At block 602, a CU (e.g., the gNB-CU 410) of a base station (e.g., the base station 123) receives a configuration message (e.g., the an SgNB Addition Request message) including configuration information (e.g., an SCG-ConfigInfo message, a CellGroupConfigInfo message, or a CG-ConfigInfo message) from a master node of a dual-connectivity communication with a UE (e.g., UE 110). The configuration information further contains a Current Dedicated SCG Configuration (e.g., sourceConfigSCG IE). The CU includes the configuration information in a CU to DU RRC Information IE for a UE Context Setup Request Message.

At block 604, the CU determines whether to use a delta configuration or a full configuration. This can be based on the received configuration information (e.g., SCG-ConfigInfo message, CellGroupConfigInfo message, or CG-ConfigInfo message). If the CU determines to use a delta configuration, at block 606, the CU includes the Current Dedicated SCG Configuration in the configuration information for the UE Context Setup Request Message. If the CU determines to use a full configuration at block 608, the CU does not include the Current Dedicated SCG Configuration from the configuration information for the UE Context Setup Request Message. This can be achieved by the CU generating a configuration information according to the received configuration information except the current dedicated SCG configuration, or that the CU takes the received configuration information but removes the current dedicated SCG configuration from it.

At block 610, the CU generates the User Equipment (UE) Context Setup Request message. At block 612, the CU sends the UE Context message to a DU (e.g., the gNB-DU 421) of the base station. At block 614, the CU receives cell-group configuration (CellGroupConfig IE) generated by the DU.

At block 616, the CU generates a secondary node configuration using the received cell-group configuration and, at block 618 the CU sends the secondary-cell-group configuration (e.g., CG-Config message) in a configuration response message to the master node.

Figure 7:
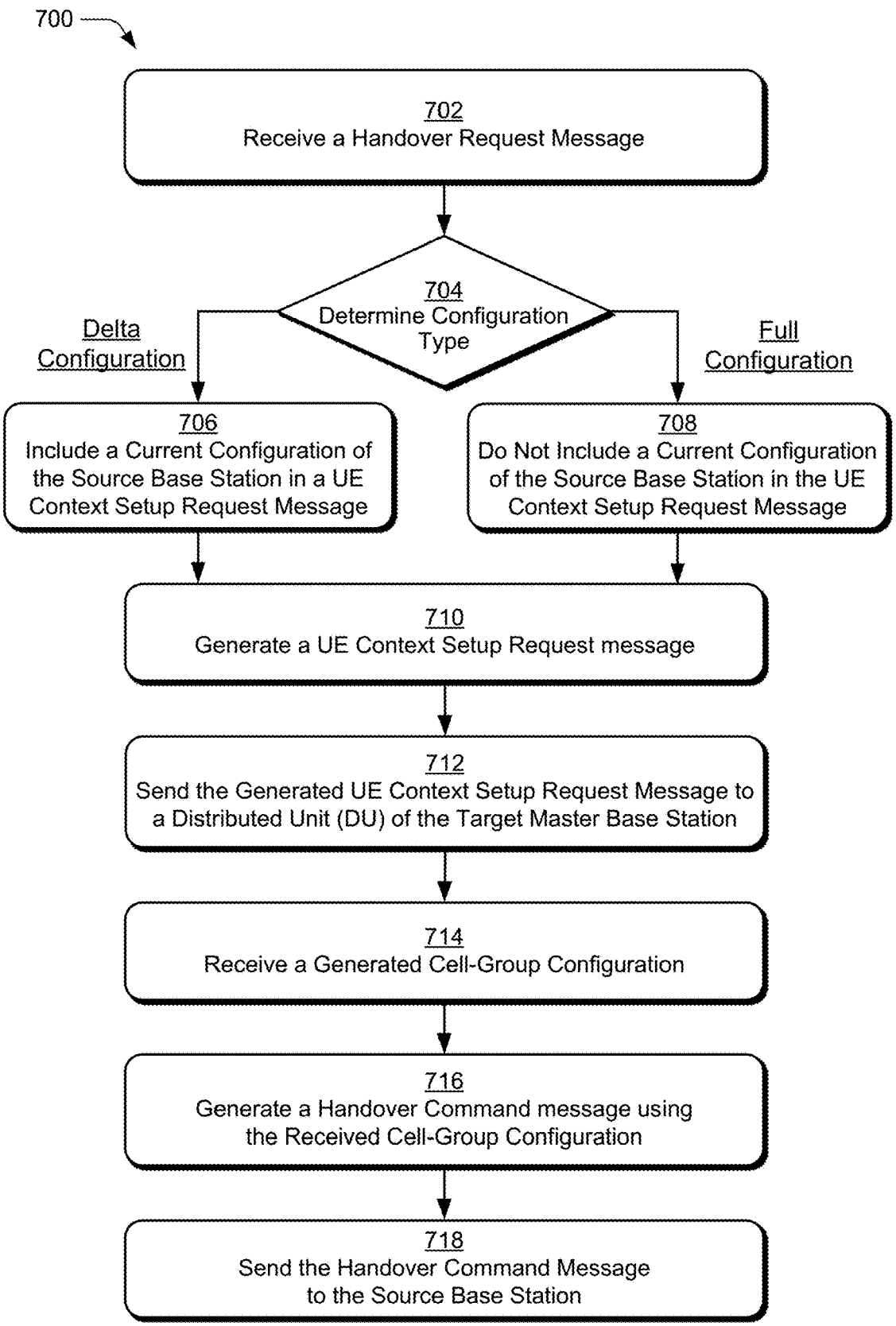
FIG. 7 illustrates an example method of delta and full configuration for a master base station handover in accordance with one or more aspects of central unit-distributed unit architecture.

FIG. 7 illustrates example method(s) 700 of central unit-distributed unit architecture as generally related to delta and full configuration for a master base station handover. At block 702, a CU (e.g., the gNB-CU 410) of a target base station (e.g., the base station 123) receives a Handover Request message including configuration information (e.g., HandoverPreparationInformation message) from a source base station. The configuration information further contains a Current Configuration (e.g., sourceConfig IE). The CU includes the configuration information in a CU to DU RRC Information IE for a UE Context Setup Request Message.

At block 704, the CU determines whether to use a delta configuration or a full configuration. This can be based on the received current configuration information (e.g., sourceConfig IE). If the CU determines to use a delta configuration, at block 706, the CU includes the Current Configuration information in the configuration information for the UE Context Setup Request Message. If the CU determines to use a full configuration at block 708, the CU does not include the Current Configuration from the configuration information for the UE Context Setup Request Message. This can be achieved by the CU to generate a HandoverPreparationInformation message according to the received HandoverPreparation-Information message except the configuration information used in the source node, or that the CU takes the received HandoverPreparationInformation message but removes the configuration information used in the source node from it.

At block 710, the CU generates the User Equipment (UE) Context Setup Request message. At block 712, the CU sends the UE Context message to a DU (e.g., the gNB-DU 421) of the base station. At block 714, the CU receives cell-group configuration (CellGroupConfig IE) generated by the DU.

At block 716, the CU generates a Handover Command using the received cell-group configuration and, at block 718 the CU sends the Handover Command to the source base station in a Handover Request Acknowledge message.

Although aspects of central unit-distributed unit architecture have been described in language specific to features and/or methods, the subject of the appended claims is not necessarily limited to the specific features or methods described. Rather, the specific features and methods are disclosed as example implementations of central unit-distributed unit architecture, and other equivalent features and methods are intended to be within the scope of the appended claims. Further, various different aspects are described, and it is to be appreciated that each described aspect can be implemented independently or in connection with one or more other described aspects.

What is claimed is:

1. A method for determining a user equipment (UE) context by a central unit (CU) of a base station engaged as a secondary base station in dual-connectivity communication with a first UE, the method comprising:

receiving, at the CU of the base station, a first configuration message including a first configuration information from a master node of the dual-connectivity communication;
based on the received first configuration information, determining a first configuration type;
based on the determined first configuration type, generating a first UE Context Setup Request message for the first UE;
sending, by the CU, the generated first UE Context Setup Request message to a Distributed Unit (DU) of the base station, the generated first UE Context Setup Request effective to direct the DU to generate a first cell-group configuration;
receiving, from the DU, the first generated cell-group configuration;
generating a secondary-cell-group configuration using the received first cell-group configuration; and
sending the secondary-cell-group configuration in a configuration response message to the master node of the dual-connectivity communication to configure the first UE.

2. The method of claim 1, wherein the determined first configuration type is a delta configuration, and wherein generating the first UE Context Setup Request message comprises:
including a current dedicated Secondary Cell Group (SCG) configuration in the first UE Context Setup Request message.

3. The method of claim 1, wherein the determined first configuration type is a full configuration, and wherein generating the first UE Context Setup Request message comprises:
not including a current dedicated SCG configuration from the first UE Context Setup Request message.

4. The method of claim 1, wherein sending the secondary-cell-group configuration in the configuration response message directs the master node to send a Radio Resource Control (RRC) message to the first UE.

5. The method of claim 1, wherein the first configuration message is a secondary base station (SgNB) Addition Request message, and wherein the first configuration information is an SCG-ConfigInfo message, a CellGroupConfig-Info message, or a CG-ConfigInfo message.

6. The method of claim 1, wherein the first cell-group configuration is a CellGroupConfig IE.

7. The method of claim 1, wherein the secondary-cell-group configuration is an CG-Config message.

8. The method of claim 1, the method further comprising:
receiving, at the CU of the base station, engaged as a target base station without dual-connectivity or as a target master base station in dual-connectivity, a Handover Request message including a second configuration information from a source base station for a second UE;
based on the second configuration information from the source base station, determining a second configuration type;
based on the determined second configuration type, generating a second User Equipment (UE) Context Setup Request message for the second UE;
sending, by the CU, the generated second UE Context Setup Request message to the Distributed Unit (DU) of the base station, the generated second UE Context Setup Request effective to direct the DU to generate a second cell-group configuration;
receiving the second generated cell-group configuration;
generating a Handover Command including the received second cell-group configuration; and
sending the Handover Command in a Handover Request Acknowledge message to the source base station.

9. The method of claim 8, wherein the determined second configuration type is a delta configuration, and wherein generating the second UE Context Setup Request message comprises:
including a current configuration of the source base station in the second UE Context Setup Request message.

10. The method of claim 8, wherein the determined second configuration type is a full configuration, and wherein generating the second UE Context Setup Request message comprises:
not including a current configuration information of the source base station from the second UE Context Setup Request message.

11. The method of claim 8, wherein sending the Handover Command in the Handover Request Acknowledge message to the source base station is effective to cause the source base station to send a Radio Resource Control (RRC) message to the second UE.

12. The method of claim 11, wherein the RRC message is an RRCReconfiguration message or an RRCConnectionReconfiguration message.

13. The method of claim 8, wherein the second configuration information included in the Handover Request message from the source base station is a sourceConfig.

14. The method of claim 8, wherein the second cell-group configuration is a CellGroupConfig Information Element (IE).

15. The method of claim 8, wherein the Handover Command is a HandoverCommand message.

16. A base station device comprising:
a central unit (CU); and
one or more distributed units (DU), each DU being connected to the CU via an F1 interface;
the CU configured to:
receive a first configuration message including a first configuration information from a source base station for a first UE;
based on the received first configuration information from the source base station, determine a first configuration type;
based on the determined first configuration type being a delta configuration or a full configuration, generate a first User Equipment (UE) Context Setup Request message for the first UE;
send the generated first UE Context Setup Request message to at least one of the one or more DUs using the F1 interface;
at least one of the DUs configured to:
receive the first UE Context Setup Request message using the F1 interface;
generate a first cell-group configuration;
send the generated first cell-group configuration to the CU using the F1 interface;
the CU configured to:
receive the generated first cell-group configuration using the F1 interface;
generate a Handover Command including the received first cell-group configuration; and
send the Handover Command to the source base station in a Handover Request Acknowledge message to configure the first UE.

17. The base station device of claim 16, wherein the CU determines that the first configuration type is the delta configuration, and wherein the CU is further configured to:
include a current configuration information in the first UE Context Setup Request message.

18. The base station device of claim 16, wherein the CU determines that the first configuration type is the full configuration, and wherein the CU is further configured to:
not include a current configuration information from the first UE Context Setup Request message.

19. The base station device of claim 16, wherein the first configuration message is a Handover Request message and wherein the first configuration information is a sourceConfig IE.

20. The base station device of claim 16, wherein the first cell-group configuration is a CellGroupConfig IE.

21. The base station device of claim 16, wherein the Handover Command is a HandoverCommand message.

22. The base station device of claim 16 the CU further configured to:
receive a second configuration message including a second configuration information from a master node for a second UE;
based on the received second configuration information, determine a second configuration type;
based on the determined second configuration type, generate a second User Equipment (UE) Context Setup Request message for the second UE;
send the generated second UE Context Setup Request message to at least one of the one or more DUs using the F1 interface;
at least one of the DUs configured to:
receive the second UE Context Setup Request message using the F1 interface;
generate a second cell-group configuration;
send the generated second cell-group configuration to the CU using the F1 interface;
the CU configured to:
receive the generated second cell-group configuration using the F1 interface;
generate a secondary-cell-group configuration using the received second cell-group configuration; and
send the secondary-cell-group configuration in a response message to the configuration message to the master node to configure the second UE.

23. The base station device of claim 22, wherein the CU determines that the second configuration type is a delta configuration, and wherein the CU is further configured to:
include a current dedicated Secondary Cell Group (SCG) configuration in the second UE Context Setup Request message.

24. The base station device of claim 22, wherein the CU determines that the second configuration type is a full configuration, and wherein the CU is further configured to:
not include a current dedicated SCG configuration from the second UE Context Setup Request message.

25. The base station device of claim 22, wherein the second configuration message is a secondary base station (SgNB) Addition Request message and wherein the second configuration information is an SCG-ConfigInfo message, a CellGroupConfigInfo message, or a CG-ConfigInfo message.

26. The base station device of claim 22, wherein the second cell-group configuration is a CellGroupConfig IE, and wherein the secondary-cell-group configuration is a CG-Config message.

* * * * *